United States Patent [19]
Becnel, Jr. et al.

[11] Patent Number: 5,690,820
[45] Date of Patent: Nov. 25, 1997

[54] WELLHEAD BRINE TREATMENT

[75] Inventors: Lawrence F. Becnel, Jr., Sugarland; Thomas M. Ellis, Houston, both of Tex.

[73] Assignee: Texas Brine Corporation, Houston, Tex.

[21] Appl. No.: 797,880

[22] Filed: Feb. 10, 1997

Related U.S. Application Data

[62] Division of Ser. No. 367,869, Jan. 3, 1995, Pat. No. 5,637,228.

[51] Int. Cl.$^6$ .................................................. C02F 1/58
[52] U.S. Cl. ................... 210/170; 210/198.1; 210/205; 210/209; 210/220; 210/221.1
[58] Field of Search ..................... 210/170, 198.1, 210/205, 209, 220, 221.1

[56] References Cited

U.S. PATENT DOCUMENTS

| | | | |
|---|---|---|---|
| 3,606,466 | 9/1971 | Fernandes | 299/5 |
| 3,655,333 | 4/1972 | Stenger et al. | 23/89 |
| 5,028,302 | 7/1991 | Rutherford et al. | 204/98 |
| 5,126,019 | 6/1992 | Rutherford et al. | 204/98 |
| 5,366,514 | 11/1994 | Becnel et al. | 23/303 |

*Primary Examiner*—Neil McCarthy
*Attorney, Agent, or Firm*—Peter F. Casella

[57] ABSTRACT

This invention relates to methods, systems and apparatus for producing primary treated brine, i.e. <20 ppm calcium, magnesium, strontium and barium ions at the wellhead of underground salt caverns formed by depletion of their salt content by previous solution mining operations. The purified brine produced is maintained in an anerobic state and transported to chlor-alkali plant installations for use in electrolysis cells for the production of chlorine, sodium hydroxide and hydrogen. Raw brine produced at an operating brine wellhead is injected into a depleted salt cavern along with the treatment chemicals required to purify the raw brine. A novel installation including a producing well or wells, a depleted well cavern or caverns, and support facilities for producing primary treated brine is provided. Also, special wellhead injection tubing, a mixer and radial distributor for injecting the fluids into the cavern are employed which allows for the chemical reaction, precipitation, settling and clarification operations to take place in a preselected reaction zone in the cavern. The cavern acts as the reactor for precipitation, settler and clarifier and deposition site for storage of the precipitates which are innocuous solid by-products of the purification process. The methods, systems, installations and apparatus of this invention provide environmental, investment cost and operating advantages, as compared to surface brine treating facilities and operations at the chlor alkali plant installation, or, as compared to other subterranean attempts to purify brine.

9 Claims, 3 Drawing Sheets

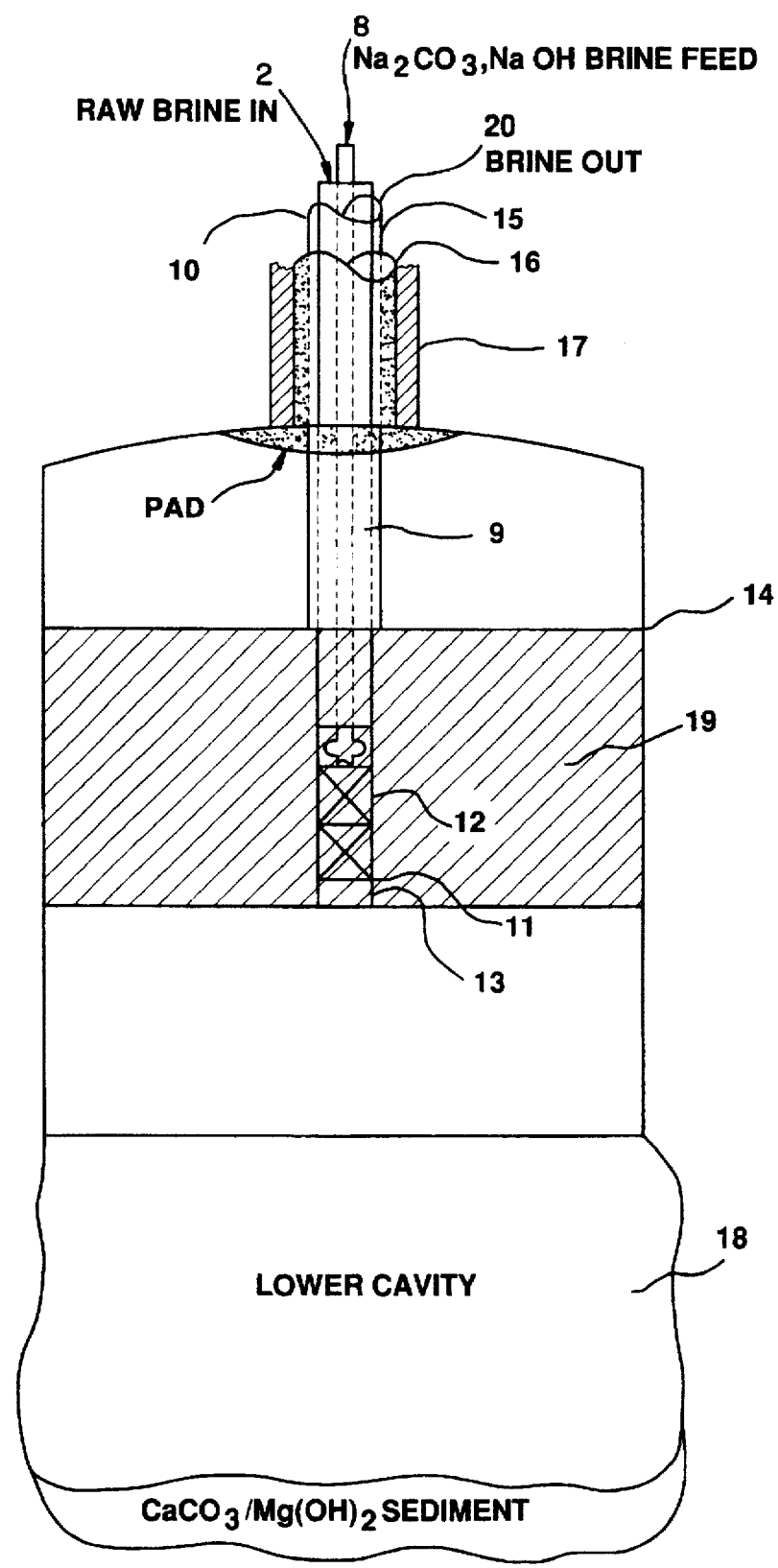

WELLHEAD BRINE TREATMENT

This application is a division of application Ser. No. 08/367,869, filed Jan. 3, 1995, now U.S. Pat. No. 5,637,228.

BACKGROUND OF THE INVENTION

Salt is one of the most abundant materials on earth and is one of the largest volume inorganic materials used in industry in the production of chlorine and caustic soda by the electrolytic processes. It is used in the manufacture of many products, both organic and inorganic. Salt is produced by direct removal as rock salt from underground deposits, by solution mining underground deposits, or by evaporation from solution mining or naturally occuring brines or sea water. Underground deposits are large beds of concentrated salt which have been deposited through evaporation of brines over the geological ages. Underground deposits are mined as rock salt using conventional mining techniques or by solution mining, creating a brine. In solution mining, water or unsaturated brine is pumped into the salt bed, the salt is dissolved in the water, and the resultant brine is brought to the surface. After a period of operation, determined by the size of the cavern produced and governed by cavern salt wall stability and surface subsidence considerations, the well is shut down, leaving an unused cavern. These caverns may be used for storage of petroleum reserves and chemicals among other fluid materials or the well might be plugged in accordance with regulations. Many processes and techniques have been disclosed for storage of fluid materials in these empty caverns.

The raw brine produced and recovered at the wellhead of an active solution mining well must be purified for many of its uses, especially if it is to be electrolyzed in chlor-alkali cells to make chlorine, sodium hydroxide and hydrogen or for producing sodium. Many processes and techniques have been disclosed for the purification of the brine produced by the solution mining processes for use in electrolytic cells. U.S. Pat. No. 3,655,533 is an example disclosing a process for purifying salt or brine already produced. U.S. Pat. Nos. 5,028,302 and 5,126,019 are examples of processes purification of brine for use in chlor-alkali membrane cell plant installations which require strict specifications on the amount of impurities, including calcium, magnesium, strontium, sulfate and chlorate ions.

The purification of raw brine for use in chlor-alkali electrolytic cells may involve several purification operations depending on the type of electrolytic cell employed and the purity specifications which allow for the continuous and efficient operation of the cells. Primary treatment systems include means for treating brine with caustic soda (or cell liquor from the cathode compartment of the cell) and sodium carbonate or any other additives that may be necessary to eliminate impurities such as calcium, magnesium, iron, strontium, etc. An important specification for primary treated brine for use in chlor-alkali electrolysis cells is that it contain less than about 20 ppm divalent calcium and less than about 1 to 2 ppm divalent magnesium. The next purification operation usually includes polishing the primary treated brine to remove solids in a thickener followed by a sand filter or other type filter to remove fine solids from the thickener overflow. Additional or secondary treatment systems may be employed in those cases where specifications for the brine to be electrolyzed are such that specific ions, such as calcium, magnesium, other divalent cations and sulfate anions in brine to be electrolyzed in membrane type chlor-alkali electrolytic cells, must be reduced to a minimum. These purification operations have traditionally been carried out at the chlor-alkali electrolytic cell plant installation.

Processes have been described in the prior art for the production of purified brine at the salt mining site. One such process for the production of purified brine injects the purification chemicals into the water during the solution mining of the brine in an operating well and is described in U.S. Pat. No. 3,606,466 issued on Sep. 20, 1971 to Dudley P. Fernandes. This process is not practiced commercially because it does not produce brine of sufficient purity for use in chlor-alkali electrolytic cell without further primary treatment of the brine at the electrolytic cell plant installation site and has been found to be inoperative for that purpose, as will be explained.

OBJECTS OF THE INVENTION

It is an object of this invention to provide a method for producing primary quality brine suitable for use in chlor-alkali electrolysis cell installations, after filtration, at the wellhead site of underground salt caverns that have been formed by depletion of their salt content by previous solution mining operations, thereby eliminating the requirement for installing and maintaining primary brine treatment facilities at the chlor-alkali electrolysis cell installation site.

It is also an object of this invention to provide a process for producing primary treated brine which does not require excessive amounts of treatment chemicals but which allows for use of an excess of soda ash not exceeding 100 to 200 ppm, as compared to other known surface or underground treatment processes where excesses of 800 to over 1000 ppm are commonly employed.

It is a further object of this invention to employ underground salt caverns which have been formed by previous solution mining operations as the purification and clarification apparatus, as well as the deposition point for the solid precipitates which are non-hazardous by-products resulting from the purification reaction, thereby eliminating the need for sludge disposal facilities, land fills, and the like that are attendant and required at surface treatment plants.

It is still a further object of this invention to provide systems, installations and methods of operation for producing primary quality brine at the wellhead site of underground salt caverns for use in membrane type cells which brine contains about 20 to 25 per cent of the calcium ion content of primary treated brine produced by surface plant treatment facilities, thereby allowing for a substantial reduction in the ion exchange regeneration frequency with concomitant reduction in costs. The brine produced in accordance with this invention may also be used in the production of pure salt for sodium manufacture in molten salt electrolytic cells, and also for many other uses without further purification, other than polishing filtration.

It is still a further object of this invention to provide special wellhead injection tubing, mixer, and radial distributor (tip or nozzle) for injecting fluids into the cavern which allows for the chemical reactions, precipitation and subsequent settling and clarification to take place in a pre-selected zone, i.e. the reaction zone, in the cavern while avoiding pluggage of the injection apparatus with precipitate formed by the purification reactions.

It is a still further object of this invention to provide an underground brine purification installations and methods of operation which allow for the disposal of innocuous by-product solids at the bottom of the cavern in which the purification and clarification operations are taking place, thereby providing an environmentally friendly operation which contributes to maintaining the ecological balance in the materials employed in the operation and production of the high quality brine. Precipitated metal species are thus returned to their origin, i.e. the salt cavern, with no environmental impact.

BRIEF DESCRIPTION OF THE INVENTION

These and other objects are accomplished by applicant's invention including methods, systems, installations and apparatus comprising an unique wellhead brine purification installation including the combination of employing an underground salt cavern which has been depleted of salt content by previous solution mining operations, as the combined reactor, settler and site for depositing precipitated by-products, which is in further combination with a special wellhead injection tubing and radial distributor for injecting the fluids into the cavern.

The objects of this invention are also realized by applicants invention which further comprises employing in combination with the underground brine purification operations, special wellhead injection tubing, mixer and radial distributor for injecting fluids into the cavern which allows for the precipitation and clarification reactions to take place in a pre-selected zone in the cavern, in a manner which avoids contacting the treated brine with undissolved, settled cavern salt contaminents which are detrimental to chlor-alkali cell operation including calcium and magnesium sulfate, other magnesium salts, strontium salts, etc. thereby allowing for the withdrawal of high purity brine of primary treated brine quality produced in the cavern. The pre-selected reaction zone in the cavern, the determination of which is described later, acts as the reactor for the purification reactions and the settler for the clarification operations, and the cavern bottom becomes the deposition site for the settling precipitated by-products of the purification process.

In accordance with this invention, we employ methods, systems, installations and apparatus for producing high purity brine of primary treated brine quality, i.e. a total of <20 ppm calcium, magnesium, strontium and barium ions, and more preferably as low as a total of <2 ppm of these ions. At the wellhead of underground salt caverns that have been formed by depleting their salt content by previous solution mining operations. The raw brine produced at the wellhead of an operating brine well is injected in solution into a depleted salt cavern. The treatment chemicals required for purification of the raw brine are also injected into the cavern through a string of tubing, mixer and radial distributor nozzle and in a manner and amounts scheduled in accordance with the teachings of this invention, thereby producing the high purity brine, all as described in detail hereinafter. The purified brine produced is transported, usually by pipeline, to chlor-alkali plant installations for use in electrolysis cells for the production of chlorine, sodium hydroxide and hydrogen. The brine produced by this invention is of such high purity that it is only necessary to polish (or filter) it to remove sediment by passing it through sand type or other polishing filters at the electrolytic cell plant installation site, before it is used in diaphragm type electrolytic cells; and when used in membrane cell plant installations, to polish and ion exchange treat the brine in order to meet the very low calcium, magnesium, strontium, and other multi-valent metal cations specifications for membrane cell brine.

The methods, systems, installations and apparatus of this invention provide environmental, investment cost and operating cost advantages and savings, as compared to surface brine treating facilities and operations at the chlor-alkali plant installation and as compared to other processes for subterranean brine purification.

In order that this invention may be more readily understood it will be described with respect to simplified flow diagrams and to certain preferred embodiments, especially as contained in the attached Figures, and examples given below; however it is to be understood that these embodiments are not to be construed as limiting the invention except as defined in the appended claims.

BRIEF DESCRIPTION OF THE DRAWINGS

FIG. 3 is a drawing of the special wellhead injection tubing and radial distributor installed in depleted brine cavern and showing the pre-selected reaction zone, i.e. where the treatment chemicals react with the raw brine and where the purification including precipation, settling and clarification take place, in the cavern, and where the precipitated solids fall into the inactive storage zone at the bottom of the cavern. Also shown is the injection of the raw brine and the removal of purified brine from the cavern.

DETAILED DESCRIPTION OF THE INVENTION

We have found methods, apparatus, systems and installations for producing purified brine at the wellhead of underground salt caverns that have been formed by depletion of their salt content by previous solution mining operations, thereby eliminating the requirement for installing and maintaining primary brine treatment facilities and attendant sludge disposal facilities at the chlor-alkali electrolysis cell installation site, thereby producing a friendly environmental operation of the chlor-alkali electrolysis cell installation.

Further, we have found that we can control the location and depth of the reaction zone for chemically treating and clarification of the raw brine to practically any cross section level in the depleted cavern by employing a special injection nozzle, which injects raw brine solution to be treated thru tubing which terminates at a radial distributor, placed in the cavity at a predetermined depth and location. It is only necessary to provide sufficient space at the bottom of the cavern to store the sludge precipitated in the reaction zone. Accordingly, in accordance with this invention, the reaction zone is maintained in the upper portion of the cavity sufficiently above the storage zone to prevent undesirable mixing between them.

Figure 1:
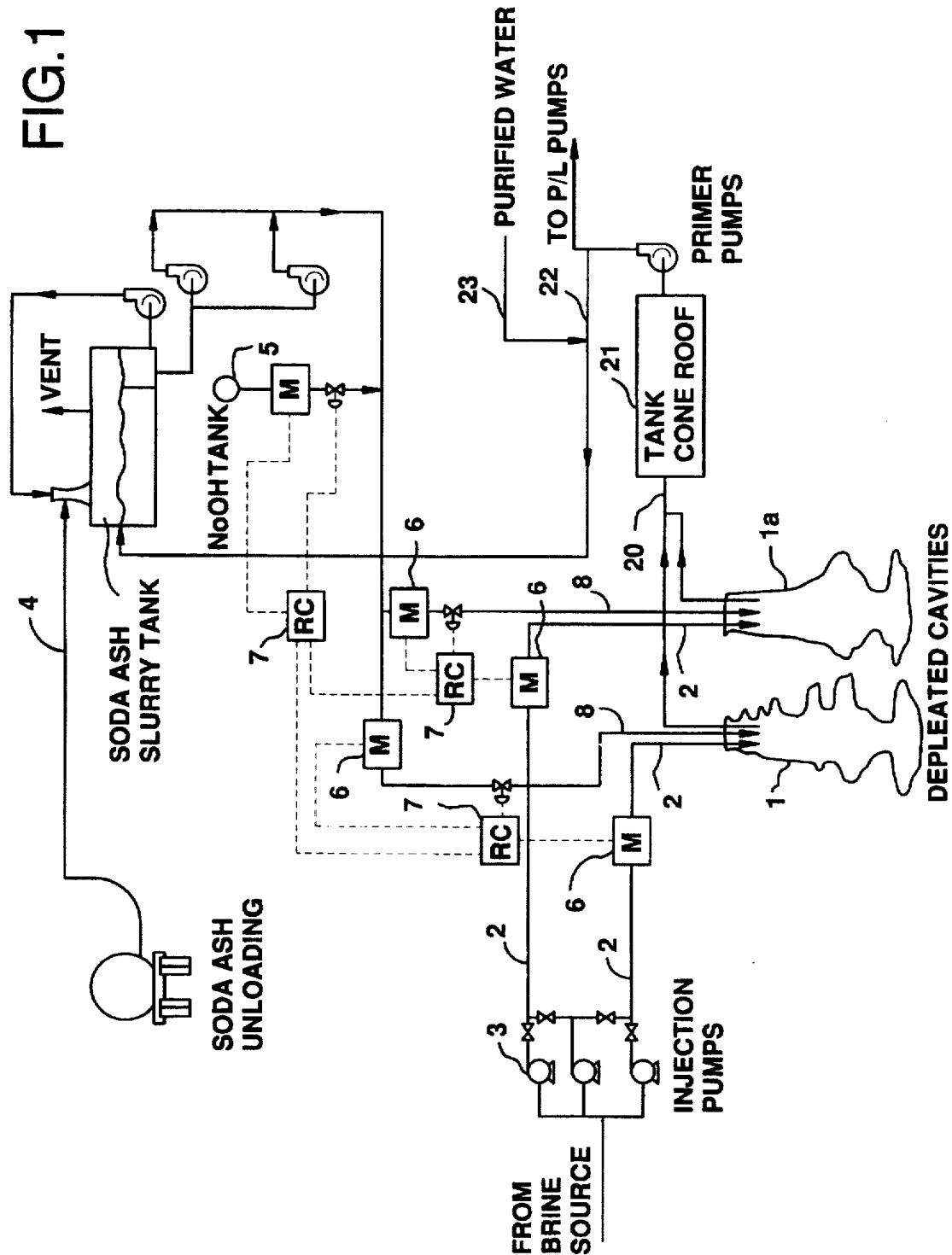
FIG. 1 is a flow sheet of a preferred embodiment of the unique system installation showing the injection pump facility, a depleted cavern(s), treating chemicals system, and the treated brine transport facilities. Not shown are the operating wells producing the raw brine.
Figure 2:
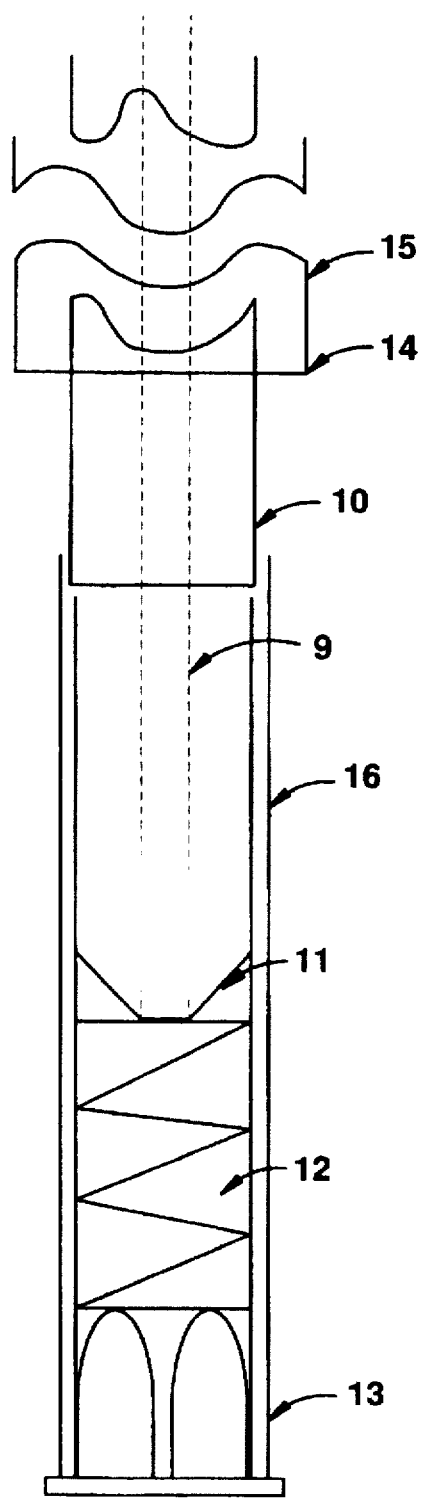
FIG. 2 is a detailed drawing of the special wellhead injection mixer and radial distributor tip or nozzle for injecting fluids into the cavern which allows for the precipitation reactions and subsequent clarification to take place in pre-selected zones in the cavern.

Among the features of this invention which are shown in the Figures are the following:

FIG. 1 is an overall flow diagram showing two depleted cavities, 1 and 1a, in parallel and employed for treating a total of about 2200 gallons per minute of raw, saturated NaCl brine, 2. In the process, conventional centrifugal pumps, 3, are used for injecting saturated brine, 2, into the depleted cavity(ies), 1 and 1a. In the case shown, the injection point is 2300 feet underground but varies with each particular cavity and is relatively near the top of the depleted cavity(ies) as shown in FIG. 3. See FIG. 3. Treating chemicals, typically sodium carbonate, 4, and sodium hydroxide, 5, which are dissolved in treated brine or pure water are mixed with raw brine, 2, at the very bottom of the raw brine injection tubing, 11 (in FIG. 3), near the 2300 foot depth. This is effected by use of appropriate injection pumps, 3, and flow measuring devices, 6, to supply required amounts of these reactants as indicated by calcium and magnesium contaminant levels measured in the raw brine and measured raw brine flow rate. Reagents are ratio controlled, 7, into the system. Reagent solution is pumped through a small diameter tube, 9 (in FIG. 3), located inside the raw brine injection tubing, 10, (typically 1.3 inch tubing suspended inside 7 inch raw brine tubing, 10). This small tube, 9, extends from the wellhead, (not shown in FIG. 3), down to the injection tip apparatus, 11, and ends just above the mixer, 12, located inside the tubing. See FIGS. 2 and 3. Soda ash and caustic soda solution ($Na_2CO_3$ and $NaOH$) (dissolved in treated brine) enters the non-stick coated tip, 11, (coated with Teflon®, E.I. DuPont, Wilmington, Del.) and is thoroughly mixed with injected raw brine, 2, from the 7 inch tubing, 10, as both streams pass through the static mixer, 12 (employing Kenics mixer blades by Chemineer, Inc., N. Andover, Mass.). Immediately after mixing, the mixture is injected into the cavern through a Teflon coated, "4 post" radial distributor, 13, shown in detail in FIG. 2. The distributor causes brine to flow radially toward the cavern walls.

As the reagents are admixed into the raw brine, precipitation of calcium carbonate and magnesium hyroxide begins. Brine flow in the cavern is radially outward and axially upward at the injection point because brine is removed from an upper annulus, 14, created, in this depiction, by the 7 inch injection tubing, 10, suspended within the 10¾ inch tubing, 15. These two tubing strings, and the 1.3 inch internal string, are all suspended from, and hydraulically sealed from one another by the conventional wellhead apparatus, (not shown). The assembly hangs down into the cavern through larger (typically 13⅜ inch) cemented tubing, 17. The cemented tubing provides bore hole integrity by isolating the tubing assembly mechanically and hydraulically from surrounding rock, salt, formation liquids, etc. It is called casing, 16.

As the brine and reagents traverse the space immediately above and adjacent to the injection point, the reactions reach equilibrium and crystallized calcium carbonate and magnesium hydroxide ($CaCO_3$ and $Mg(OH)_2$) so formed agglomerate and settle to the cavern bottom. Brine in the lower cavity, 18, is displaced upward into the reaction zone, 19, by these settling precipitates and eventually emerges from the 10¾ inch hanging string, 15, at the wellhead. Sufficient reagents are added to precipitate calcium and magnesium from this relatively small quantity of displacement brine as well as provide an excess above stoichiometric requirements to drive reactions to a practical low equilibrium dissolved $CaCO_3$ and $Mg(OH)_2$ concentration in the entire brine stream. Excess reagents (soda ash) in the range of 100 to 200 ppm (whereas up to ten times that amount are used in smaller surface reactors and clarifiers) are maintained. The large reduction of excess soda ash employed is realized in accordance with this invention because there is such a large clarification which provides extended reaction and solids agglomeration and settling time as compared to necessarily smaller surface facilities.

The cavity cylindrical zone between the reaction zone at the injection point, 13, and the hanging end of the 10¾ inch tubing, 14, is called the reaction zone, where settling and clarifying of the precipates formed take place, 19. See cross hatched portion of FIG. 3. Within this zone, the precipitates settle downward from the upflowing brine, the precipitation reaction reaches completion, and the treated brine flows upward to the 10¾ inch×7 inch tubing annulus, 14, at the top of the zone and then out of the well via this annular conduit to the 10¾ inch wellhead port. The distance between the injection tip, 13, and the 10¾ inch inlet, 14, is set at 3 or more standard tubing lengths (about 42 feet each) to allow over 120 feet total depth of active zone. The cavern average radius is selected such that less than 0.1 to 0.2 GPM brine upflow per square foot of horizontal cross sectional area occurs. This insures reaction completion and adequate clarification of the treated brine before it flows up the 10¾×7 inch annulus, 14, to leave the cavern.

Treated brine exiting the 10¾ inch port of the wellhead is transported via pipeline, 20 (FIG. 1), to a closed tank, 21. The brine system is maintained free of dissolved oxygen and is contained to avoid atmospheric contamination by dust, etc. This is accomplished by sound operating and maintainance practices and results in acceptable concentrations of dissolved iron (from corrosion) when the brine reaches the chlor-alkali plant.

The total calcium, magnesium, strontium, and barium concentration in treated brine exiting the treating cavity will be less than 2 ppm. Such brine is suitable for direct feed to a diaphragm or mercury cell chlor-alkali plant after passing it through a polishing filter for tramp solids removal. This filter is located in the chlor-alkali plant. This polished brine is also suitable for feed to the ion exchange system in membrane cell chlor-alkali plants, following suitable polishing.

Thus in accordance with this invention the wellhead brine treatment process produces primary quality brine requiring only polishing filtration for chlor-alkali plant consumption with the following advantages. All sludge formed in the process remains in the cavern; accordingly, associated environmental considerations and disposal costs are eliminated. The process allows for the production of the primary quality brine employing only 100 to 200 ppm excess soda ash, i.e. excess above that stoichiometrically required to react with dissolved calcium and other cations in the brine. Operation at 800 to over 1500 ppm excess soda ash in surface treatment facilities located at the chlor-alkali plant installation is common practice. This allows for substantial economic savings in the continued operations in accordance with our invention. The brine treatment facilities at the chlor-alkali plant installation are eliminated or reduced to a simple polishing filter to insure that minor quantities of solids do not enter the chlor alkali process plant. Operation and maintenance costs for this equipment at the plant site are reduced to only those required to operate the much simpler wellhead facilities at the brine production location.

In the statement of the Background of This Invention reference was made to the Fernandes U.S. Pat. No. 3,306, 466. In that process excessive amounts of soda ash are required because an excess of calcium sulfate is present in the active cavity, and as soon as the calcium is precipitated from the cavity brine as calcium carbonate, more calcium sulfate dissolves into the brine (which now is reduced in calcium content) thereby requiring more sodium carbonate for treating. The dissolution rate of calcium sulfate in the treated brine is higher because the calcium concentration is lower (driving force for mass transfer is higher). Therefore more soda ash must be added than that amount required for a surface treatment facility and of course more than required in accordance with this invention. This added amount of soda ash renders Fernandes system described in U.S. Pat. No. 3,606,466 uneconomical.

A typical salt depleted brine cavity may be about 2000 to 3000 feet below ground level having an irregular diameter averaging 100 to 200 feet, and a depth of perhaps 750 to 1000 feet. The reactor zone employed in accordance with this invention can be customized to have a fairly uniform diameter in the predetermined portion of the cavern selected to be the reaction zone. This zone is usually in the upper portion of the cavity, and may be at the top of the cavity in contact with the cemented casing in those cases where it is determined that a casing pad is not necessary. In solution mining well operations, the pad prevents dissolution of salt at the cavern top and cemented casing seat. The sides of the cavity at that location are fairly regular or can be customized to be regular. The depth of the zone may be about 200 feet deep. It is preferable to locate the reaction zone as close to the top of the cavity as practical, since the deeper the zone is from the surface the more power expended for pumping the solutions into the cavity. Also by locating the reaction zone close to the top of the cavity, ample distance is provided between the bottom of the cavity, where the precipitates of the purification and clarification reaction drop and are stored, thereby minimumizing if not eliminating any mixing and contamination of the reaction zone contents by undesirable ions such as calcium. In such cases of optium operation, and especially where a relatively large reaction zone is provided, it is apparent that only a minimum excess of soda ash will be required in order to safegard the purity of the product. This is so because the large reaction zone provides space and time for the reactants to mix with each other and for the calcium carbonate precipitate to leave the vicinity of the reaction thus not getting involved in the chemical equilibrium, thereby permitting the reactions to go to completion without requiring much excess of soda ash.

It is only necessary to provide sufficient space at the bottom of the cavern to store the sludge precipitated in the reaction and clarification zone. Acccordingly, in accordance with this invention, the reaction zone is maintained in the upper portion of the cavity and is sufficiently large to allow the reactions to go to completion. The reaction zone is always above the storage zone to prevent undesirable mixing between the contents of the reaction zone and the storage zone. When the reaction (purification and clarification) zone is predetermined to have an average diameter of about 112 feet and employing about 100 feet of depth for the reaction zone, then the reaction area will be approximately 10,000 sq ft and have an active volume of about 7,500,000 gallons of fluid.

When employing a reaction zone of the same depth and having an average diameter of about 170 feet, the reaction area will be about 22,000 square feet and the active volume of fluid will be 16,500,000 gallons. Two or more such caverns may be arranged in parallel in accordance with this invention, to provide the volume capacity of primary treated brine required for large or multiple chlor-alkali plant users. A large chlor-alkali plant requires about 2000 GFM of primary treated brine. By arranging the two caverns described above about 1000 GFM of primary treated brine can be produced from each cavern on a continuous basis.

The hydraulic losses from pumping the raw brine down, and the primary treated brine out of the cavern coupled with the quantity of primary brine required are the factors to be considered in determining whether one or two or more depleted caverns should be employed to satisfy the production requirements. The equipment employed will allow for producing less than 0.1 gallon per minute per sq foot of cross section in the cavern of primary treated brine without excessive pumping costs becoming involved.

Accordingly, it can be seen that a variety conditions and circumstances of production and usage can be realized in accordance with the teachings of this invention.

For example, where parallel caverns are employed, one cavern can be idled while the second is operated at maximum rate to allow maintenance of the system with continued operation.

The treating system can also be employed with various combinations of the sulfate control process patented by Texas Brine Corporation in U.S. Pat. Nos. 5,028,302 and 5,126,019. Also, this wellhead brine treatment process can be used in combination with a plant installation for electrolytic production of elemental sodium. Further, this wellhead brine treatment process can be used in combination with an evaporative salt plant installation such as described in U.S. Pat. No. 5,366,514, issued Nov. 22, 1994 to Becnel, et al and assigned to Texas Brine Corporation. Other applications are also contemplated such as use in water softening plants, in rubber plants and oil well installations where high purity brine is used as a density modifier in drilling fluids, and other operations where high purity brine is required in the plant operations.

Although we have exemplified our invention using only the treatment chemicals soda ash and caustic soda dissolved in treated brine, it is apparent that other soluble chemicals or additives may be introduced to the solutions injected into the depleted salt cavern, as may be required to remove other objectional ions that may be found in the raw brine. When employing water as the solvent for the treatment chemicals or additives to be injected, we prefer to employ water that has been treated to remove objectional ions, thereby minimumizing pluggage of the soda ash injection tubing.

Also we have exemplified using specific amounts of the treatment chemicals soda ash and caustic soda. In the case of caustic soda the amount employed should be sufficient to precipitate all the magnesium in the raw brine as magnesium hydroxide. For the same reasons that less excess soda ash is required for calcium precipitation, less excess caustic soda will be required for magnesium precipitation.

The concentration of soda ash solution employed in the above examples was given as about 32% which, for the conditions of the example, was the optium amount for producing the primary treated brine from the raw brine employed and which avoids using large excesses of recycled purified brine. Concentrations in the range of about 25 to 32% may satisfactorily be employed.

In the foregoing description of the static mixer and radial distributor it was indicated that those parts are preferably coated with Teflon®, a non-stick polymer for coating metal parts sold by E.I. Dupont, Wilmington, Del. Among the various non-stick coatings which may be employed for coating the mixer and radial distributor parts that are exposed to the reactants in the reaction zone are preferably the Dupont Teflon Industrial Coatings, including Teflon PTFE, Teflon FEP, Teflon-FEP, Teflon-P PFA, Telzel ETFE, and Teflon-S. Other polymer resins which have similar low coefficient of friction, adhesion to metals and chemical resistance charactistics may be employed for coating the parts of the wellhead system that are exposed to the reactants in the reaction zone.

The static mixer employed in the foregoing description was a typical metal blade mixer as supplied by Chemineer, Inc. of Houston, Tex. under the Kenics brand name. Other type mixers which have similar fluid mixing characteristics may be used and it is only necessary that they be designed to prevent clogging, which is accomplished in part by non-stick coating of the metal parts exposed to the reactants in the reaction zone.

The radial distributor employed in the foregoing description was of the four post type and is small enough in diameter to traverse the tubing during installation. Other type radial distributors which have similar fluid distribution characteristics may be used and it is only necessary that they be designed to avoid clogging, which is accomplished in part by non-stick coating of the metal parts exposed to the reactants in the reaction zone and that there be effective distribution of the injected raw brine and chemical reactants, horizontally in the cavern rather than downward or upward thereby allowing for the chemical reaction, precipitation, settling and clarification operations to take place in the pre-selected reaction zone in the cavern.

It is to be understood that various modifications within the spirit and scope of our invention are possible, some of which have been referred to above, and although we have given detailed descriptions of preferred embodiments of our invention, by illustrating them with specific examples, we do not intend to be limited thereto, except as defined by the following claims.

We claim:

1. A brine purification installation comprising:

a depleted salt cavern fitted with a wellhead injection apparatus comprised of tubing, a mixer and a radial distributor, said tubing having means for injecting and removing fluids to and from said cavern, means for mixing the fluids injected into the cavern, reaction, precipitation, settling and clarification means, and means for disposing and storing waste precipitates in the bottom of said cavern.

2. The installation in accordance with claim 1 wherein the means for mixing and radially distributing the fluids in the cavern are positioned in the upper half of the cavern and sufficiently above the storage bottom of the cavern.

3. The installation in accordance with claim 1 wherein the tubing, mixer and radial distributor parts exposed in the reaction zone are coated with a non-stick polymer resin.

4. The installation in accordance with claim 3 wherein the tubing, mixer and radial distributor parts exposed in the reaction zone are coated with a non-stick fluoro ethylene polymer resin.

5. A wellhead injection apparatus comprised of:

lengths of tubing, a mixer and a radial distributor, said tubing comprised of three concentric pipes, forming an inner fluid injection tube, a center fluid injection annulus and an outer fluid removing annulus, the first and second tubings terminating at about the same distance of their length and the third tubing creating the outer annulus terminating substantially above the first and second tubings terminus, said first and second tubings being fitted with a mixer and radial distributor for fluids.

6. The wellhead injection apparatus of claim 5 wherein the tubing, mixer and radial distributor parts exposed to the reaction zone are coated with non-stick polymer resin.

7. A combined mixer and radial distributor for injecting fluids into an underground cavern through wellhead tubing comprising:

a unitary housing within said wellhead tubing, fluid inlet means in said housing, said mixer being fitted into the wellhead tubing and consisting of metal blades coated with non-stick polymer resin disposed in said tubing, said radial distributor also being coated with non-stick polymer resin and fitted into said tubing and below said mixer, said radial distributor consisting of a plurality of posts in wedge form with outlet means for radially distributing fluids, said mixer and radial distributor being adapted to be fitted to the wellhead injection tubing.

8. An underground depleted salt cavern comprised of a wellhead injection apparatus, a reaction zone, including a fluid mixer and radial distributor in said reaction zone, and a bottom waste storage site.

9. The underground depleted salt cavern of claim 8 when injected with raw brine, treatment chemicals and exiting purified brine.

* * * * *